United States Patent [19]

Hattori et al.

[11] 4,417,288
[45] Nov. 22, 1983

[54] BROKE FOR MAGNETIC DISC DRIVE APPARATUS

[75] Inventors: Toshiaki Hattori; Yasuichi Hashimoto, both of Oume, Japan

[73] Assignee: Tokyo Shibaura Denki Kabushiki Kaisha, Kawasaki, Japan

[21] Appl. No.: 328,998

[22] Filed: Dec. 9, 1981

[30] Foreign Application Priority Data

Dec. 18, 1980 [JP] Japan .................................. 55-178012

[51] Int. Cl.³ .......................................... G11B 19/22
[52] U.S. Cl. .................................. 360/74.1; 318/371; 369/268
[58] Field of Search ..................... 360/74.1, 97, 98, 99, 360/86; 318/371; 369/268

[56] References Cited

U.S. PATENT DOCUMENTS

| 981,601 | 1/1911 | Adams | 318/371 |
| 2,194,759 | 3/1940 | Logan | 318/371 |

FOREIGN PATENT DOCUMENTS

| 2917385 | 11/1980 | Fed. Rep. of Germany | 360/97 |
| 56-22254 | 3/1981 | Japan | 360/74.1 |

Primary Examiner—George G. Stellar
Attorney, Agent, or Firm—Oblon, Fisher, Spivak, McClelland & Maier

[57] ABSTRACT

A rotation control device for a magnetic disk drive apparatus, which provides electrical regenerative braking of the apparatus prior to and continuously with actuation of an electro-mechanical braking system, once power is cut off to the apparatus. The use of electrical regenerative braking minimizes wear on the mechanical braking components and reduces maintenance on the apparatus. The use of electro-mechanical braking at low speeds assures reliable continuous braking when the electrical regenerative braking becomes relatively ineffective at low speeds.

8 Claims, 4 Drawing Figures

BROKE FOR MAGNETIC DISC DRIVE APPARATUS

BACKGROUND OF THE INVENTION

1. Field of the Invention

This invention relates to a rotation control device for a magnetic disc drive apparatus.

2. Discussion of the Prior Art

A magnetic disc drive apparatus includes a magnetic disc rotated by a drive means and a magnetic head floating a short distance from the magnetic disc, whereby information is written on the magnetic disc and read from the magnetic disc by the magnetic head.

Recently used has been the currently so-called CSS (Contact Start Stop) type for the magnetic head of the magnetic disc drive apparatus wherein the magnetic head contacts the magnetic disc when it is not rotated, and wherein the magnetic head begins to float from the magnetic disc when the rotation speed of the disc reaches a particular level. In this type of magnetic disc drive apparatus, the magnetic disc rotation is broken usually by means of mechanical braking. However, for actuation of a mechanical brake device, it is necessary to reduce the rotation speed of the disc drive motor below a predetermined rotation speed. If the mechanical braking is done early, the brake-shoe must soon be replaced by a new one due to wear. Therefore, actuation of the mechanical brake device should be considered based on measuring the rotation speed both mechanically and electrically. However, it is not feasible in view of the large size of the total apparatus, the expense, and the inherent measuring error to measure rotation speed mechanically. On the other hand, upon braking it is impossible to measure speed electrically without providing another power source, because an electrical measurement of rotation speed must be done after a mechanical brake apparatus has cut off the power source to the total apparatus. Moreover, in the event that only regenerative braking is employed wherein motor coils are short circuited, there is a danger of damage to the disc and the magnetic head drive apparatus because at low speed regenerative braking is ineffective, resulting in contact of the magnetic disc with the magnetic head while the disc is still rotating and damage thereto.

Another possible method is to use reverse regenerative braking which is produced by providing the motor with reverse current in phase when braking is intended. One advantage of this method is that a larger torque is generated by the regenerative braking, and more power is available for braking even if the motor rotates slowly. However, there is a risk that the motor will begin to rotate reversely if the reverse current is not cut off before the motor has complete stopped. The disadvantages of this method are that it is too difficult to detect the instant the motor becomes completely stopped and it is necessary to provide the motor with the reverse current. Therefore it becomes ineffective if the power source is cut off.

SUMMARY OF THE INVENTION

It is accordingly a principal object of this invention to provide a new and improved rotation control device for a magnetic disc drive apparatus having a mechanical brake and which employs regenerative braking before actuating the mechanical brake, and wherein the actuating of the mechanical brake is begun automatically below a predetermined rotation speed.

It is another object of this invention to provide a rotation control device for a magnetic disc drive apparatus which minimizes wear of the mechanical brake device thereby resulting in a long useful life of the mechanical brake device and decreased maintenance thereof.

It is a further object of this invention to provide a rotation control device for a magnetic disc drive apparatus which actuates a regenerative brake immediately after cutting off an electrical power source.

These and other objects are achieved according to the invention by providing a new and improved rotation control device for a magnetic disc drive apparatus including a direct current motor for driving a magnetic disc, in which the motor has at least three coils; electrical means for regeneratively braking the motor including means for short circuiting selected motor coils which induce an emf having opposite phase; electromechanical means for braking the motor at or below a predetermined motor speed, including a brake drum coupled to an axis of the direct current motor, and a brake shoe normally contacting the brake drum under force of a spring, a direct current solenoid for driving the brake shoe against the force of the spring to break contact between the brake drum and the brake shoe, wherein the solenoid is supplied with driving current by another coil of the motor coils, and control means for actuating the electrical braking means as a regenerative brake and for actuating the mechanical brake at or below a predetermined motor speed.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENT

Figure 1:
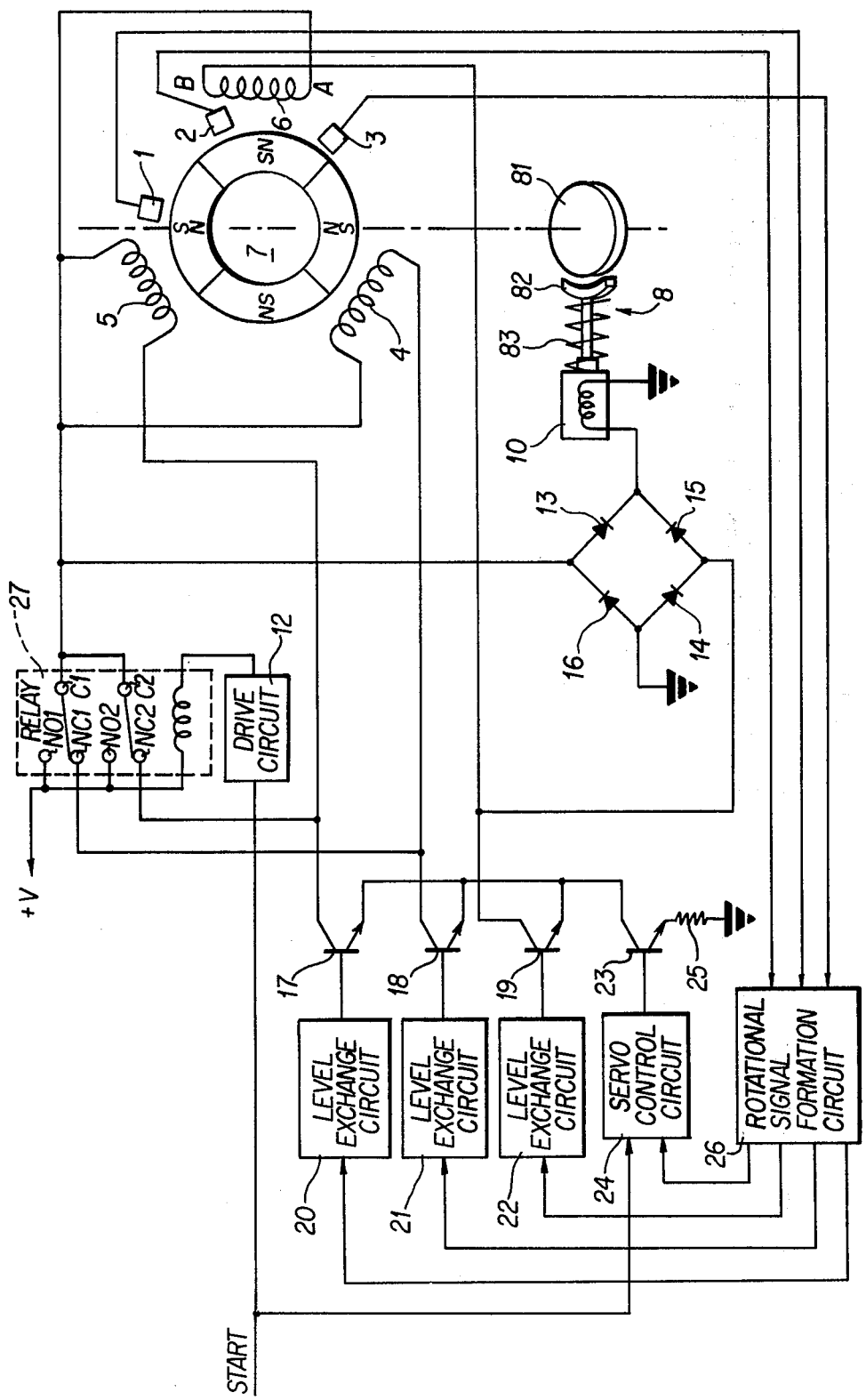
FIG. 1 is an illustration of an embodiment of this invention which includes a perspective view of the mechanical brake apparatus, a sectional view of the electrical brake system, and a control circuits therefore.

Referring now to the drawings, wherein like reference numerals designate identical or corresponding parts throughut the several views, and more particularly to FIG. 1 thereof, three Hall effect elements 1, 2 and 3 for detecting the position of a rotor of a direct current motor 7 by means of alteration of flux caused by the rotation of the rotor are shown. Motor 7 includes stator coils, 4, 5 and 6. Coils 4 and 5 induce electromotive forces opposite in phase. A mechanical brake apparatus 8 includes a brake drum 81, a brake shoe 82 and a return spring 83. A direct current solenoid 10 actuates the brake shoe 82. The mechanical brake apparatus 8 normally brakes the direct current motor 7 by application of force from the return spring 83 against the brake shoe 82 by which the brake shoe 82 is pressured toward the brake drum 81. When the direct current solenoid is turned on, the brake shoe 82 is separated from the brake drum 81 against the force of the return spring 83 by the direct current solenoid 10.

Figure 2:
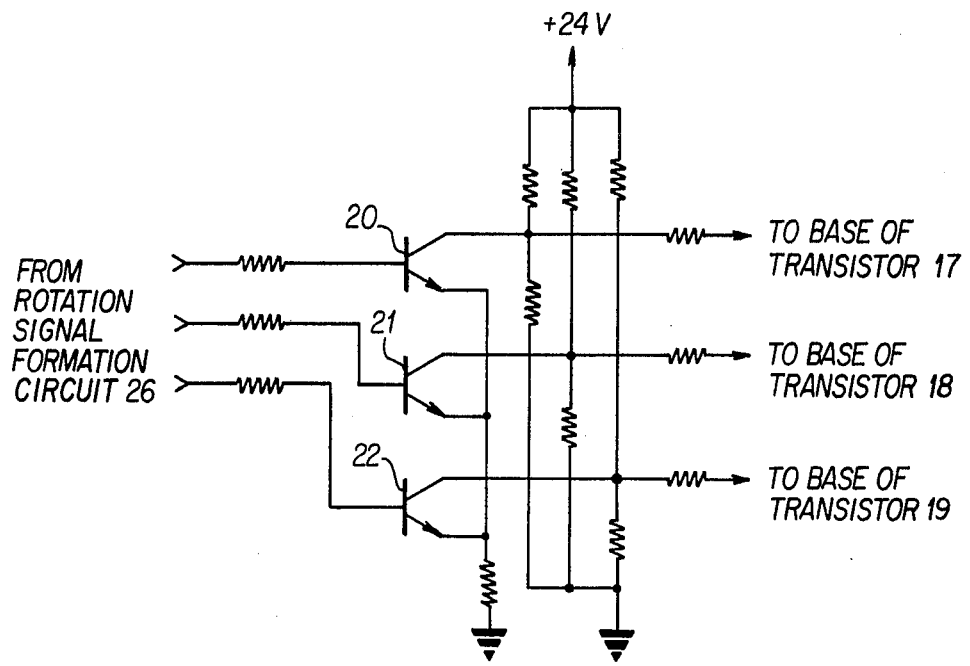
FIG. 2 is a schematic diagram of the level exchange circuits of the present invention.

In response to the externally supplied start signal (shown by START) applied to rotate the magnetic disc, the output of the drive circuit 12 goes "high" and transmits a driving signal to energize the a relay 27. With the relay 27 energized, a driving signal from the source $+V$ drives the direct current motor 7. The relay 27 includes two contacts $NO_1$ and $NO_2$ supplied with a source $+V$, another two contacts $NC_1$ and $NC_2$ connected to the collectors of transistors 17 and 18, and contacts $C_1$ and $C_2$ which are selectively connected to $NO_1$, $NO_2$ and $NC_1$, $NC_2$ under control of the driving signal. According to the state shown in FIG. 1, the relay 27 has no driving signal applied thereto from the drive circuit 12. The bases of transistors 17, 18 and 19 are connected to level exchange circuits 20, 21 and 22, respectively as shown in FIG. 2. The emitters of transistors 17, 18 and 19 are commonly connected to the collector of transistor 23 whose emitter is grounded through a resistor 25 and whose base is connected to a servo control circuit 24. A rotation signal formation circuit 26 transmits signals to the level exchange circuits 20, 21 and 22 and the servo control circuit 24, which is enabled by "START", in response to detecting signals indicative of the rotation phase of the rotor of the direct current servo motor 7 provided by means of the Hall effect elements 1, 2 and 3. A bridge type rectifier circuit is formed of diodes 13, 14, 15 and 16, wherein the junction between the diodes 14 and 16 is grounded, and the junction between the diodes 13 and 16 is connected to the contacts $C_1$ and $C_2$ of the relay 27 and to one of the terminals of each of coils 4, 5 and 6 of the direct current servo motor 7. The other terminals of the coils 4, 5 and 6 are connected to the collectors of transistors 18, 17 and 19 respectively. The junction between diodes 13 and 15 is connected to the direct current solenoid 10. Moreover the junction between the diodes 14 and 15 is connected to the collector of the transistor 19. Under the abovementioned connections, the relay 27 under control of drive circuit 12 short circuits the two coils 4 and 5, inducing electromotive forces (emf's) whose phases are opposite each other, for electrical braking of the magnetic disc drive.

Nextly described is the operation of the invention shown in FIG. 1.

Figure 3:
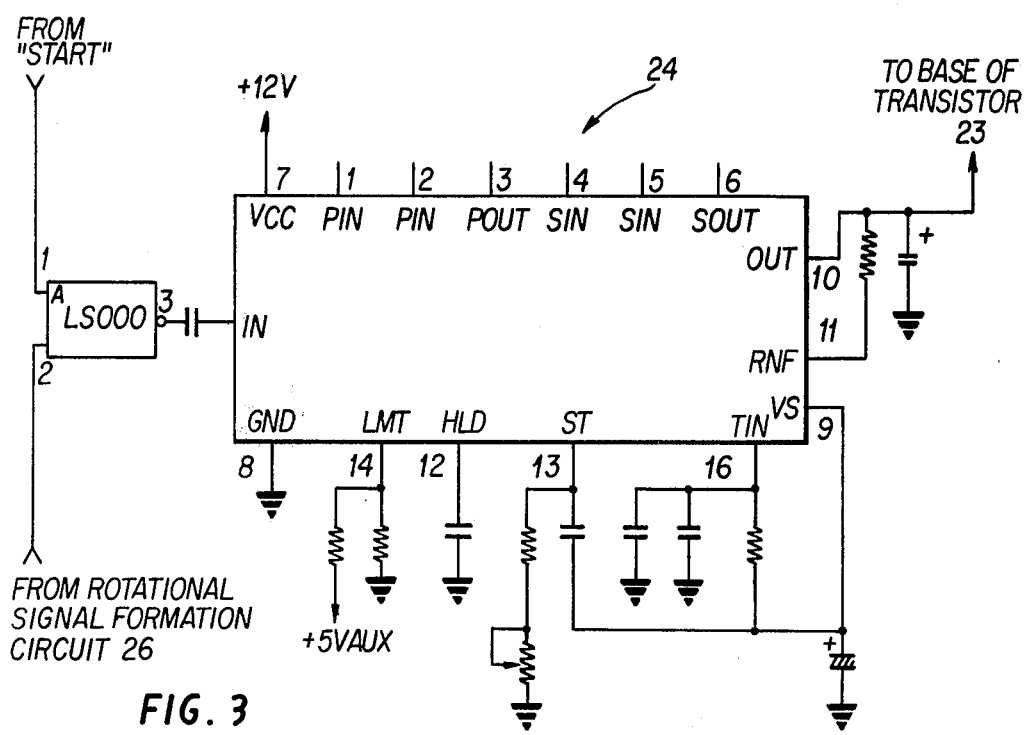
FIG. 3 is a schematic diagram of the servo control circuit of the present invention.

At first, the contacts $NO_1$-$C_1$ and $NO_2$-$C_2$ of the relay 27 are connected by the drive circuit 2 in response to a "High" start signal, so that the source $+V$ is supplied to the diode 13 through the relay 27, and then the direct current solenoid 10 is actuated. And the return spring 83 is contracted. Therefore, rotation of the direct current motor 7 is possible since the brake shoe 82 is distant from the brake drum 81. At the same time the coils 4, 5 and 6 are supplied with the source $+V$ through the relay 27. On the other hand, the rotation signal formation circuit 27 shown in FIG. 4, supplies each of the level exchange circuits 20, 21 and 22 with a timing signal as determined by the Hall Effect Elements to turn on the coils 4, 5 and 6, and the servo control circuit 24, such as a µPC 1043C manufactured by Nippon Electric Co., are shown in FIG. 3, with a rotation signal. (See, for example, the manufacturer's application notes for details concerning the internal structure and operation of the microprocessor). Thereby, the servo control circuit 24, which is enabled by START, supplies the transistor 23 with a large potential to turn on if the rotation of the direct current motor 7 is under a predetermined speed. Then, the level exchange circuits 20, 21 and 22 as shown in FIG. 2 their operation which is well known to those skilled in the art sequentially supply the respective transistors 17, 18 and 19 with a potential to turn on at the instant, the coils 4, 5 and 6 are actuated and the rotor (not shown) is rotated. At this time, the transistors 17, 18 and 19 do not turn on simultaneously, but are controlled sequentially by the timing signal supplied by the rotation signal formation circuit 26. Then the Hall effect elements 1, 2 and 3 send detected position signals to the rotation signal formation circuit 26 when the motor 7 begins to rotate. On that basis, the rotation signal formation circuit 26 sends predetermined signals to the level exchange circuits 20, 21 and 22, and to the servo control circuit 24.

It is nextly noted that the source $+V$ is cut off when the start signal becomes "LOW", or the power switch is cut off. The relay 27 contact connections then change to $NC_1$-$C_1$ and $NC_2$-$C_2$ as shown in FIG. 1. The pair of coils 4 and 5 are shorted through the relay 27 and induce electromotive forces opposite in phase with respect to each other. In this way, regenerative braking takes place. At the same time, an electromotive force induced at the coil 6 is supplied to the junction between the diodes 16 and 13, and the junction between the diodes 14 and 15. For example, when the terminal A of the coil 6 becomes "+" and the other terminal B thereof becomes "−", the current from the terminal A flows to the terminal B through the diode 13, the direct current solenoid 10, ground, the diode 14. On the other hand, when the terminal B of the coil 6 becomes "+" and the terminal A becomes "−", the current from the terminal B flows to the terminal A through the diode 15, the direct current solenoid 10, ground and the diode 16. Then even if the source were cut off, the mechanical brake would not be actuated for a while due to current flowing through the solenoid 10 to keep the return spring 83 contractive. During this operation the direct current motor 7 undergoes regenerative braking by means of the coils 4 and 5 and reduces its rotation speed gradually until a predetermined rotation speed is reached, whereupon, in addition to the continuous regenerative braking, mechanical braking commences, because the return spring 83 is no longer pulled by current induced by the electromotive force of the coil 6. Then, the brake shoe 82 begins to contact the brake drum 81. The motor speed is thereby adjusted in relation to the electromotive force induced by the coil 6, the direct current solenoid 10 and the return spring 83.

FIG. 2 shows the level exchange circuits 20, 21 and 22. Each level exchange circuit comprises a correspondingly numbered transistor. The emitters are connected in common and through a resistor to ground. The bases are individually connected through resistors to the rotation signal formation circuit 26. There are three voltage dividers connected between source $+24$ V and ground. Each voltage divider is associated with one of the transistors. The collector of each transistor is connected to the mid-point of its voltage divider and through a resistor to the base of a corresponding transistor in a suceeding stage.

FIG. 3 shows the servo control circuit 24. It may comprise the IC indicated previously, connected as follows. Power is supplied via pins 7 and 8, $+12$ V and ground. Pins 1-6 are not utilized. Pin 10 is the output to be supplied to the base of transistor 23. Pin 10 is connected to ground via a capacitor. Pin 11 is connected to pin 10 via a resistor. Pin 14 is connected to ground via a first resistor and to the +5VAUX via a second resistor. Pin 12 is connected to ground via a capacitor. Pin 13 is connected to ground via a resistance which comprises a fixed resistor and a variable resistor in series. Pin 16 is connected to ground via a parallel pair of capacitors. Pin 9 is connected to ground via a capacitor. Pin 16 is also connected to pin 9 via a resistor. Pin 13 is also connected to pin 9 via a capacitor. The inputs are the "START" signal and a signal from the rotation signal formation circuit 26. These inputs are supplied to a LS000 circuit and the output thereof is connected to pin IN.

Figure 4:
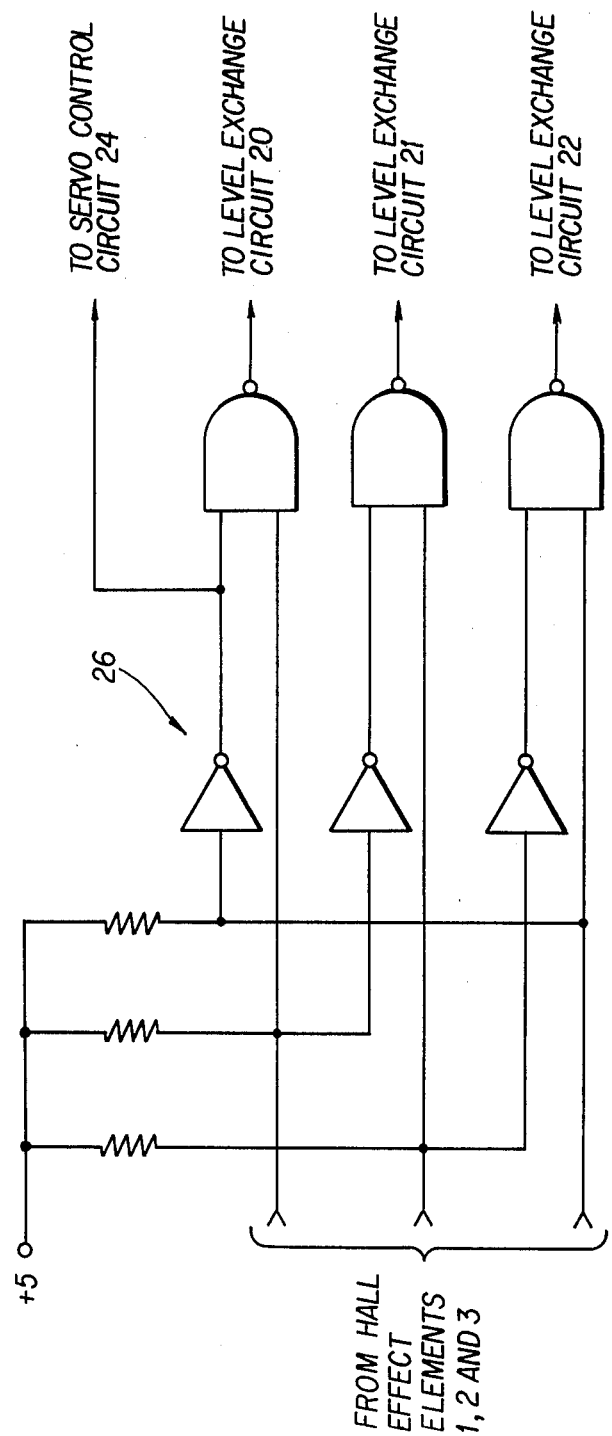
FIG. 4 is a schematic diagram of the rotation signal formation circuit of the present invention.

FIG. 4 shows the rotation signal formation circuit 26. There are three two input logic circuits which supply three of the four outputs. The output of each of the two input logic circuits is connected to the input of its corresponding level exchange circuit. One input of each of the two input logic circuits is a corresponding one of the signals supplied by the Hall effect elements 1, 2 and 3. The lines carrying these signals are connected to supply +5 via a corresponding resistor. The other input of each of the two input logic circuits is a corresponding inverter. Each two input logic circuit is paired with an inverter and the pairs are drawn in a vertical arrangement forming upper, middle and lower pairs. The input to the upper inverter is the input to the lower two input logic circuit. The input to the middle inverter is the input to the upper two input logic circuit. The input to the lower inverter is the input to the middle two input logic circuit. The fourth output is the output of the upper inverter which is supplied to the servo control circuit 24.

Obviously, numerous modifications and variations of the present invention are possible in light of the above teachings. It is therefore to be understood that within the scope of the appended claims, the invention may be practiced otherwise than specifically described herein.

What is claimed as new and desired to be secured by Letters Patent in the United States is:

1. A rotation control device for a magnetic disc drive apparatus comprising:
   a direct current motor for driving a magnetic disc;
   electrical braking means for regeneratively braking said motor;
   electro-mechanical braking means coupled to said motor and actuable at a predetermined motor speed;
   control means for actuating said electrical braking means to produce regenerative braking of said motor and for actuating said electro-mechanical braking means when said motor has reached a motor speed at or below said predetermined motor speed.

2. A rotation control device as set forth in claim 1, further comprising:
   said motor having at least three motor coils; and
   said electrical braking means comprising means for short circuiting a selected pair of said motor coils such that said pair of motor coils induce respective EMF's opposite in phase with respect to each other to produce regenerative braking of said motor.

3. A rotation control device as set forth in claim 2, wherein said electro-mechanical braking means includes:
   a brake drum coupled to an axis of said motor;
   a brake shoe normally contacting said brake drum;
   biasing means for applying a force to said brake shoe such that said brake shoe normally contacts said brake drum;
   a solenoid for operating on said biasing means to release the brake shoe from contact with said brake drum, said solenoid supplied with driving current by a selected third coil of said motor coils.

4. A rotation control device for a magnetic disc drive apparatus according to claim 3 wherein said short circuiting means includes:
   a relay shorting said selected pair of coils when an electrical power is cut off.

5. A rotation control device for a magnetic disc drive apparatus according to claim 3 wherein said selected pair of coils are stator coil of said motor.

6. A rotation control device for a magnetic disc drive apparatus according to claim 3 further comprising:
   a bridge type rectifier circuit for supplying said solenoid with driving current derived from said selected third coil.

7. A rotation control device for a magnetic disc drive apparatus according to claim 6 wherein after an electrical power source has been cut off, said solenoid is supplied with driving current through said bridge circuit to keep said biasing means contractive.

8. A rotation control device for a magnetic disc drive apparatus according to claim 3 wherein said control means includes:
   Hall effect elements for detecting rotation phase of a rotor of said motor and producing detecting signals indicative thereof;
   a rotation signal formation circuit for forming a rotation signal in response to the detecting signals from said Hall effect elements;
   level exchange circuits for supplying said motor coils with timing signals to turn on said coils in response to said rotation signal formation circuit; and
   a servo control circuit supplied with a rotation signal to detect a predetermined speed of said rotor.

* * * * *

UNITED STATES PATENT AND TRADEMARK OFFICE
CERTIFICATE OF CORRECTION

PATENT NO. : 4,417,288
DATED : November 22, 1983
INVENTOR(S) : Tashiaki Hattori et al It is certified that error appears in the above-identified patent and that said Letters Patent is hereby corrected as shown below:

The title should read

--[54]  BRAKE FOR MAGNETIC DISC DRIVE APPARATUS --

Signed and Sealed this

Tenth Day of April 1984

[SEAL]

Attest:

GERALD J. MOSSINGHOFF

Attesting Officer   Commissioner of Patents and Trademarks